No. 667,339. Patented Feb. 5, 1901.
T. G. RUFFHEAD.
NUT LOCK.
(Application filed Apr. 16, 1900.)
(No Model.)
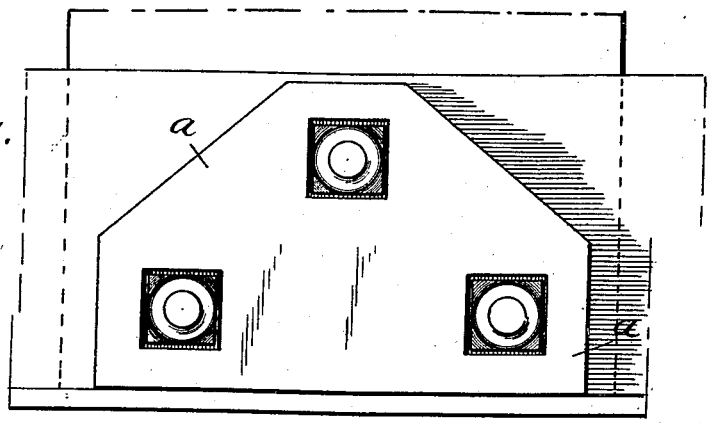
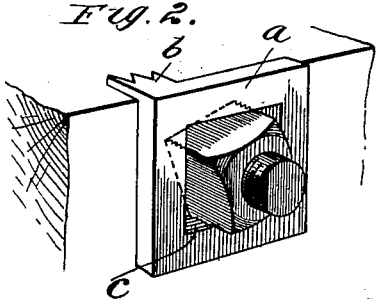 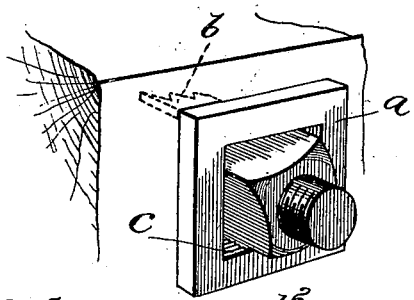
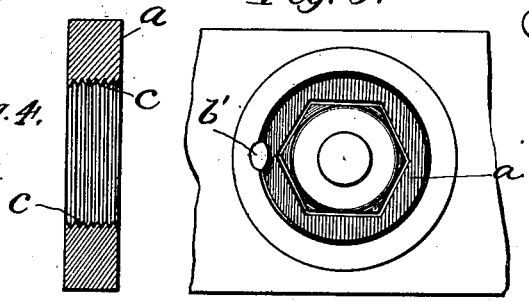 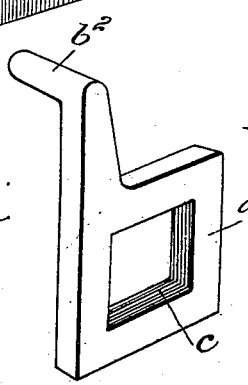
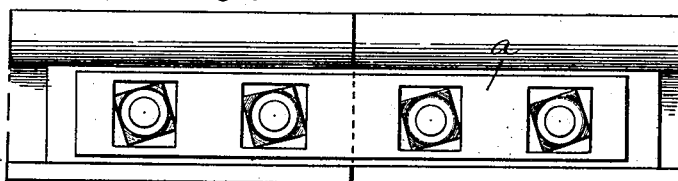
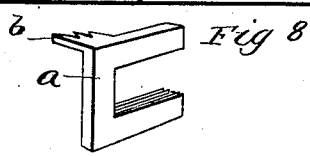
Witnesses
Inventor
Thomas G. Ruffhead
By Davis & Davis
Attorneys

UNITED STATES PATENT OFFICE.

THOMAS G. RUFFHEAD, OF WILLIAMSPORT, PENNSYLVANIA.

NUT-LOCK.

SPECIFICATION forming part of Letters Patent No. 667,339, dated February 5, 1901.

Application filed April 16, 1900. Serial No. 13,072. (No model.)

*To all whom it may concern:*

Be it known that I, THOMAS G. RUFFHEAD, a citizen of the United States, residing at Williamsport, in the county of Lycoming and State of Pennsylvania, have invented certain new and useful Improvements in Nut-Locks, of which the following is a clear, full, and exact description, reference being had to the accompanying drawings, in which—

Figure 1 is a side elevation of my device adapted to lock a series of three nuts; Fig. 2, a perspective view of the device applied to a single nut; Fig. 3, a view of a similar device, the plate being locked by a lug or tooth forced into the adjacent stationary part; Fig. 4, a vertical sectional view of the plate detached; Fig. 5, a view of the modification applied to a nut set in a recess, so as to be flush with or below the surface of the structure to which the device is applied; Fig. 6, a detail perspective view of another modified form of the device; Fig. 7, a side elevation of a form of plate adapted for use on rail-joints, and Fig. 8 is a perspective view of a slightly-modified form of the locking-plate.

The object of this invention is to provide a simple locking-plate that may be applied to one or more nuts without altering the usual form of the bolts or nuts and which when applied will effectually hold the nuts against rotation, as more fully hereinafter set forth.

Broadly speaking, the invention consists of a plate provided with an opening or openings slightly larger and of substantially the same shape as the nuts, so that when placed over the nuts and locked against rotation the nuts may be unscrewed slightly, so as to bring their corners into engagement with the inner walls of the openings in the manner of a cam action, whereby the plate will be locked against accidental removal from the nuts, as more fully hereinafter set forth.

Referring to Fig. 1, $a$ designates the locking-plate, which in this instance is made substantially triangular in shape, so as to embrace a series of three nuts, the plate being provided with an opening through which each nut extends, said opening being approximately the same shape as the nut and a little larger in diameter than the same. When the plate is placed over the nuts, as shown, the nuts having of course been first screwed up tight, the nuts are then given a partial turn backward until their corners bind hard against the inner walls of the recesses. When this is done with each nut, the plate will be effectually prevented from slipping off the nuts, and the nuts will thereby be locked securely against further loosening. It will be observed that it is essential in this form of device that the plate be of less thickness than the nuts, so that the nuts can be turned backward by a wrench. It will be observed that in this form the nuts themselves prevent the plate rotating on the nuts.

In Fig. 2 the plate is applied to a single nut, and at one corner of the plate it is provided with a lug $b$, which engages over the top of the structure to which the device is applied, and thereby prevents the plate rotating. In Fig. 3 a similar structure is employed, but the lug $b$ is sharpened, so as to enter the structure to which the device is applied.

In Fig. 5 the device is applied to a nut that is let into the surface of the structure, so as to be flush with the surface of the same. In this case the plate is prevented from rotating by means of an outward-extending lug $b'$, which engages a suitable recess formed in the inner wall of the depression in which the nut is located.

In Fig. 6 the plate is provided with a radial lug which carries a lateral finger $b^2$, which is adapted to engage in a recess in the structure or a suitable corner or other stationary part of the same.

In Fig. 7 the plate is provided with a series of four holes adapted for use upon the fish-plate of a rail-joint. In this form, as in Fig. 1, no lug or other device of that nature is needed to prevent the plate rotating, as is evident. It will be understood, of course, that the shape and size of the openings are to be varied to suit the shape and size of the nuts to be locked.

In each form of the device the inner walls of the recesses are each provided with a series of longitudinal parallel serrations or teeth $c$, which are sharpened, so as to cut into the corners of the nuts when the latter are unscrewed to bring their corners against the teeth or serrations. In this way the accidental displacement of the plate is more securely provided against.

It will be observed that this invention is applicable to a great variety of structures and without altering the structures or the common forms of the nuts and bolts. It is also evident that it is only essential that the corners of the nuts engage two opposite sides of each hole, in view of which fact the holes may be open at one side, leaving each hole with but three walls, as shown in Fig. 8.

It will be further evident that the lock-plate must be of less thickness than the nut, so that the wrench can be applied to the nut to turn it backward to a locking position, and also that the nut and the opening must be polygonal in shape, the shortest diameter of the opening being greater than the shortest diameter of the nut and less than its longest diameter, so that the nut may be given a partial turn backward and no more.

Having thus fully described my invention, what I claim, and desire to secure by Letters Patent, is—

1. A nut-lock consisting of a plate provided with an opening through which the nut to be locked extends, said opening being made a little larger than the nut and having its inner walls provided with a series of longitudinal ribs or teeth adapted when the nut is unscrewed slightly to cut into the corners thereof, said plate being provided with means for preventing its rotation independently of the structure to which it is applied.

2. A nut-lock consisting of a plate provided with a polygonal opening for the reception of a polygonal nut, said plate being of less thickness than the nut and having the shortest diameter of its opening greater than the shortest diameter of the nut and less than the longest diameter of the nut and the nut being turned backward so that its corners come in contact with and bind against two of the opposite walls of said opening, a sharp rib or tooth on one of the contacting faces biting into the opposing face when the nut is thus screwed backward, and means for preventing the plate rotating independently of the support.

3. A nut-lock consisting of a plate provided with a polygonal opening for the reception of a polygonal nut, said plate being of less thickness than the nut and having the shortest diameter of its opening greater than the shortest diameter of the nut and less than the longest diameter of the nut, so that when the nut is screwed backward the corners thereof will come in contact with and bind into locking engagement with two of the opposite walls of said opening, a sharpened entering part on one of the walls of the opening adapted to bite into one of the corners of the nut when the nut is thus screwed backward, and means for preventing the plate rotating independently of the support.

4. A nut-lock consisting of a plate provided with an opening for the reception of the nut to be locked, said opening having two of its opposite walls provided with sharpened serrations adapted to engage and cut into the opposite corners of the nut, and means for preventing the plate rotating.

5. A nut-lock consisting of a plate provided with a polygonal opening for the reception of a polygonal nut, said plate being of less thickness than the nut and said opening having its diameter greater than the shortest diameter of the nut and less than the longest diameter of the nut, so that when the nut is screwed backward the corners of the same will come in contact with and bind hard against two of the opposite walls of said opening, a projecting part on one of the contacting faces adapted to engage the opposite face when the nut is screwed backward and thereby prevent the plate coming off the nut, and means for preventing the plate rotating independently of the support.

6. In combination with a support, a bolt and polygonal nut, a plate of less thickness than the nut and bearing against the support and provided with a polygonal opening through which the nut extends, the nut projecting beyond the face of the plate, said opening having its shortest diameter greater than the shortest diameter of the nut and less than its longest diameter, and the nut being screwed back and having its corners bind or bite into two of the opposite walls of said opening, and means for locking the plate against rotation on its support.

In testimony whereof I hereunto affix my signature, in the presence of two witnesses, this 14th day of April, 1900.

THOMAS G. RUFFHEAD.

Witnesses:
HUGH GILMORE,
WM. G. ROBINSON.